Dec. 1, 1970 SUTEMARU MIZOGUCHI 3,544,121
CHUCK AND A CUTTING TOOL
Filed Nov. 21, 1967 2 Sheets-Sheet 1

SUTEMARU MIZOGUCHI.
INVENTOR

By Wenderoth, Lind & Ponack.
Atty's

SUTEMARU MIZOGUCHI.
INVENTOR

United States Patent Office 3,544,121
Patented Dec. 1, 1970

3,544,121
CHUCK AND A CUTTING TOOL
Sutemaru Mizoguchi, 1738 Oh-aza Kitahara, Ikoma-cho, Ikoma-gun, Nara Prefecture, Japan
Filed Nov. 21, 1967, Ser. No. 684,770
Claims priority, application Japan, Dec. 3, 1966, 41/110,508, 41/110,509; Jan. 24, 1967, 42/6,372; June 1, 1967, 42/46,569, all utility models
Int. Cl. B23b 31/20
U.S. Cl. 279—51                    2 Claims

ABSTRACT OF THE DISCLOSURE

A chuck for a cutting tool. An adapter has a shank hole therein with the outer end tapered outwardly, and a collet is positioned therein, and a locking nut and retaining ring are positioned around the outer end of the collet and adapter. The collet is appropriately slotted so as to be flexible for easy gripping of the shank of a tool. A stopper is positioned at the internal end of the hole against which the end of the tool can abut.

---

The present invention relates to a chuck and a cutting tool, in which a collet is inserted into an adapter used for a cutting tool, such as a drill for a boring machine or an end mill for a milling machine and the cutting tool is tightened with said collet to achieve firm gripping, and provides various features, that is, means mounting an adjustable stopper for receiving the cutting tool inside of the adapter, means increasing the contraction ratio by forming notches which pass from the inside of the collet to its outside and have a T-shape by forming slender holes at the inner end of the collet, means preventing the cutting tool and the adapter from turning by forming splines and keys and key grooves which are engaged together with the shank of the cutting tool and with the shank hole of the collet, means having a protrusion and a recess to couple the adjustable stopper and the shank end of the cutting tool to one another and turning the adjustable stopper by means of the cutting tool to adjust its position and the like. There are thus obtained such effects that the connecting force between the cutting tool and the adapter is large and their eccentricity is prevented compared with the conventional adapter. The details will become apparent by the annexed drawings and the following illustrative description.

Figure 1:
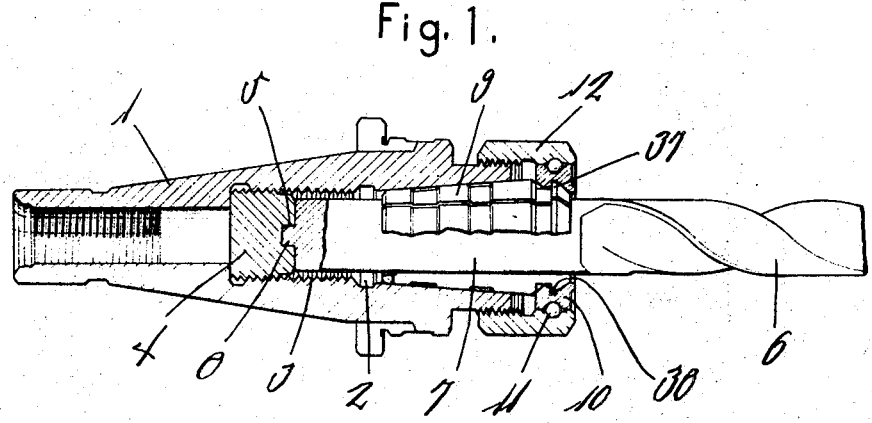
FIG. 1 is a longitudinal cross-section view of the main part showing an embodiment according to the present invention.

In FIG. 1, 1 is an adapter, capable of being fixed to the main shaft of the boring machine, the milling machine and the like to be attachable and detachable by utilizing the outer tapered face, and at the center of the adapter is formed a shank hole 2, at the inner end of which is formed a female screw 3, in which is screwed a male screw thread around the outer periphery of the adjustable stopper 4.

In the end face of said adjustable stopper 4 is formed a groove 5, and on the end of a shank 7 of a cutting tool 6, such as a drill, an end mill and the like inserted into said shank hole 2 is formed a projecting strip 8, which is engaged with said groove 5 to be attachable and detachable, as shown in FIG. 9.

Figure 4:
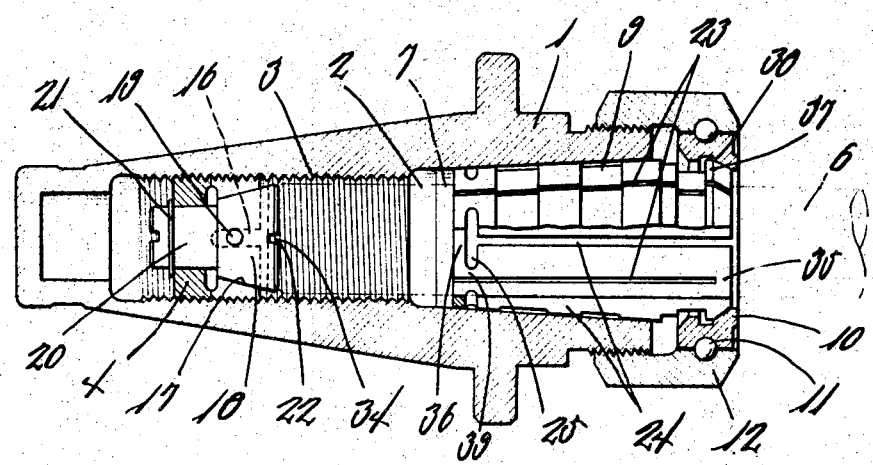
FIG. 4 is a longitudinal cross-section view of the main part showing another embodiment of the present invention.
Figure 5:
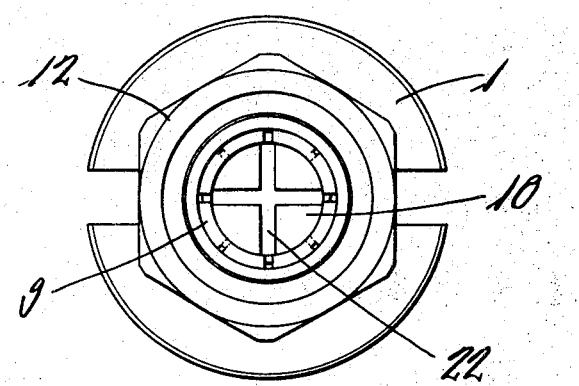
FIG. 5 is an elevation view of FIG. 4.
Figure 6:
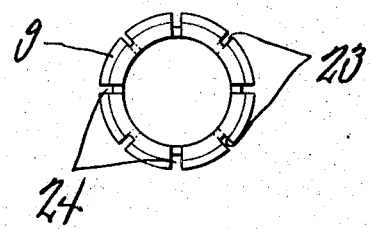
FIG. 6 is an elevation view of the collet of the embodiment shown in FIG. 4.

Numeral 9 is a collet fitted over the shank 7, and around the outer tapered face of the former is fitted the tapered face of the shank hole. Then, at the end portion of said collet 9 is fitted a retaining ring 10 around and in engagement with a peripheral projecting strip 37 and a hollow peripheral groove 38 as shown in FIG. 4 and a nut 12 is fitted on the outside of said ring to be rotatable so as to move together in an axial direction through balls 11 and is threaded on the male thread formed at the periphery of the adapter 1 end portion.

In the case of FIG. 1, when the nut 12 is turned and screwed around the male thread of the adapter 1 end portion, the collet 9 is thrust into the shank hole 2 together with the nut 12, and the collet 9 contracts by sliding of the tapered face and thereby tightens the inner shank 7. In such case, the T-shaped notches 24 are formed to the collet 9 so as to contract easily, so that tightening of the shank and attachment and detachment of the collet are readily performed. These details will be illustrated below. Thus, in the above case since the projecting strip 8 of the shank 7 end is engaged with the groove 5 of the adjustable stopper 4 mounted at the inner end of the hole 2, the turning of the cutting tool 6 is prevented and the withdrawal of the tool 6 owing to cutting pressure is also prevented by means of the adjustable stopper 4.

Figure 2:
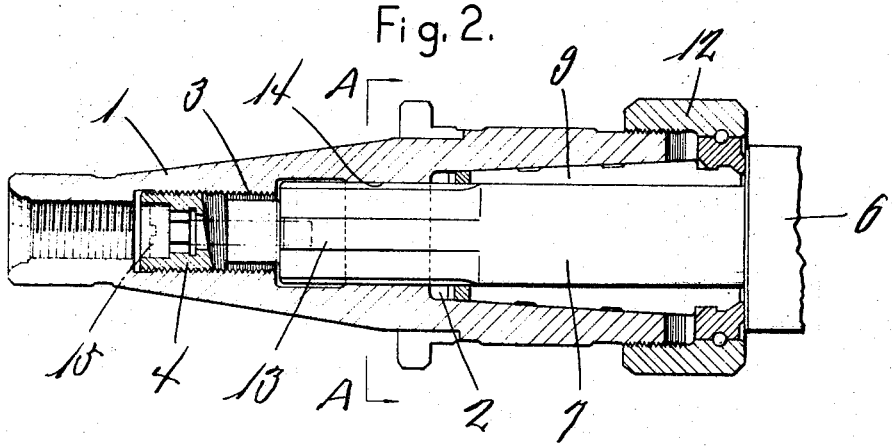
FIG. 2 is a longitudinal cross-section view of the main part of another embodiment according to the present invention.
Figure 3:
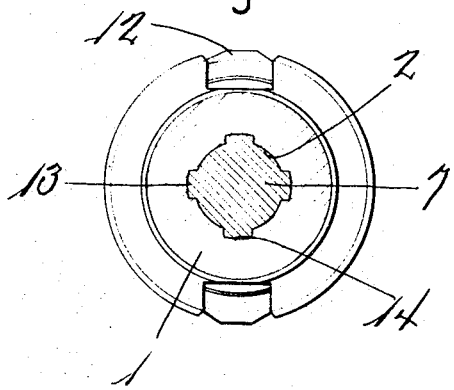
FIG. 3 is a transverse cross-section view taken along line A—A in FIG. 2.

The embodiment shown in FIG. 2 is similar to the embodiment of FIG. 1 in such points that in the shank hole 2 of the adapter 1 is inserted the shank 7 of the cutting tool 6, around which the collet 9 is fitted, and is tightened with the nut 12, and in the female thread 3 formed inside of the inserted hole 2 is screwed the adjustable stopper 4. However, this embodiment possesses the feature that turning of the shank 7 and the adapter 1 is prevented by utilizing splines.

Namely, the present chuck is made in such manner that in the end portion of shank 7 are formed plural spline projecting strips 13 and in the hole 2 are formed spline grooves 14 receiving to said projecting strips 13, and then both are engaged, so that even if a large cutting resistance against the cutting tool 6 is applied, the shank 7 never races in the adapter 1, and then damage of edges owing to racing can be prevented. Moreover, instead of said spline, use of a key and key groove produces the same effect.

Also, in the embodiment of FIG. 2 at the center of the adjustable stopper 4 is bored a central hole, extending in along the axial direction, into which a bolt 15 is inserted as in chain lines of FIG. 2 and the tip end thereof is threaded into the screwed hole of the shank 7 end, and then the head portion of the bolt 15 is engaged with the shoulder of the adjustable stopper 4. Thereby, the shank 7 can be thrust into the hole 2, and the adjustable stopper 4 and the shank 7 end can be connected therein, so that the shank 7 and the adapter 1 can be prevented from movement in the axial direction.

The embodiment in FIG. 4 is also similar to those in FIGS. 1 and 2 in such points that into the shank hole 2 of the adapter 1 is inserted the shank 7 of the cutting tool 6, around which the collet 9 is fitted, and is locked with the nut 12 and in the female thread 3 formed inside of the hole 2 is threaded the adjustable stopper 4. The present chuck in this embodiment has a feature concerning the construction for positioning the adjustable stopper 4.

Namely, in this embodiment the adjustable stopper 4 is given a tubular shape, around the outer periphery of which is formed a male thread, one or plural notches 16 being formed from the end portion of the shank side of the adjustable stopper 4 to the middle of the adjustable stopper 4. The inner peripheral face of the formed portion of said notches 16 is formed as a tapered face 17, against which a tapered wedge 18 is positioned, and a pin 19 mounted on the outside thereof is engaged with the notch 16 of the adjustable stopper 4. Then, a round shaft 20 projecting from the smaller diameter end of the wedge 18 is inserted into the central hole of the adjustable stopper 4 with its tip end protruding beyond the adjustable stopper 4 end, and around the peripheral groove formed at the round shaft 20 end projecting from the adjustable stopper 4 is fitted a fitting ring 21 to prevent the adjustable stopper 4 and the wedge 18 from separating, but to permit both to move slightly along in the axial direction. In the end face of the large diameter end of the wedge 18 is formed a cross-shaped groove 22.

In said collet 9, notches 23 reaching to the inner and the outer faces of the collet 9 are formed in the axial direction from the end portion of the smaller diameter side of the collet 9, that is, from the left end in FIG. 4 to near the right end, for example, at regular intervals may be formed four notches, at the inner end of which are located connecting portions 35 as shown in FIG. 4, and thereby the right and the left of the notches are connected, respectively. And, between said notches 23 are also formed notches 24, which reach to the inner and the outer faces of the collet 9, from the larger diameter side to the smaller one. At the inner end of said notch 24 is formed a slender hole 25, which intersects at a right angle in a T-shape and reaches to the inner and the outer faces, and along the outside of the slender hole 25 is formed, as shown in FIG. 4, the connecting portion 36.

In the embodiment of FIG. 4, if a screw driver is inserted from the tip end of the adapter 1, that is, from the right end in FIG. 4, and engaged with the groove 22 of the wedge 18 to turn the wedge 18 before the collet 9 and the tool 6 are set, the adjustable stopper 4 turns and travels inside of the female thread 3 through connection between the pin 19 and the notch 16, so that the adjustable stopper 4 can be set at any desirable position. Then, when the collet 9 is thrust into the inserted hole 2 with the nut 12 after the collet 9 and the shank 7 are inserted into the hole 2 and the shank 7 end abuts with the wedge 18, the diameter of the collet 9 can contract easily by means of the notches 23 and the notches 24, so that the collet 9 slides along the tapered hole of the hole 2 and locks the shank 7.

Consequently, since the shank 7 and the collet 9 slightly slide toward the wedge 18 and the wedge 18 is also pushed slightly, the tapered face 17 of the adjustable stopper 4 is pushed outwards by the outer tapered face of the wedge 18, and the male thread formed outside of the adjustable stopper 4 is tightly engaged with the female thread 3. Therefore, the connection between the adjustable stopper 4 and the female thread 3 never loosens despite severe rotation and vibration and precise positioning for the cutting tool 6 is maintained during cutting without variation.

Thus, in this case the positioning for the adjustable stopper 4 is easily carried out by turning of the wedge 18 by means of a screwdriver, engaged in the groove 22 of the wedge 18, and the gripping of the adjustable stopper 4 to the adapter 1 is firmly achieved by the expanding action of the adjustable stopper 4 owing to pressing engagement of the shank 7 with the wedge 18. If a projecting strip is formed on the shank 7 end to turn the adjustable stopper 4 by being inserted into the groove 22, the position of the adjustable stopper 4 can be adjusted with the shank 7, so that it is unnecessary to use the screwdriver and it is exceedingly advantageous.

Also, the collet 9 is made to facilitate expansion and contraction of the smaller diameter and by forming plural notches 23 from the smaller diameter end of the collet 9 and because of the notches 24 extending from the larger diameter end between the individual notches 23 the parts of the collet 9 are connected only by the connecting portions 35, 36, and also the portion 39 between the slender hole 25 and the notches 23 so that it can be bent easily as shown in FIG. 4, so that expansion and contraction of the collet 9 is easily carried out by a small force. Therefore, it provides the advantage that the shank 7 is strongly gripped by the collet 9 without locking the nut 12 having a strong force exerted thereon when the collet 9 is inserted into the adapter 1 and is locked with the nut 12. Particularly, since the larger diameter side of the collet 9 can be contracted easily by hand, it is easy to disengage the peripheral projecting strip 37 and the peripheral groove 38 by contracting the larger diameter end of the collet 9 and to detach the retaining ring 10 together with the nut 12.

What is claimed is:

1. A chuck for a cutting tool, comprising an adapter having a shank hole extending therethrough having at least a portion thereof at one end of the adapter internally threaded, a portion of said shank hole at the other end of the adapter having an outwardly tapered internal surface, a collet positioned in the outwardly tapered portion of said shank hole, a locking nut threaded onto the said other end of said adapter for holding the collet in the adapter, said collet having a plurality of first longitudinal slots therein extending through the entire thickness of the collet and spaced around the collet and extending from one end of the collet to a point adjacent the other end for leaving a narrow connecting portion, said collet having narrow transverse slots extending across each of said first longitudinal slots along said connection portions, and said collet also having a plurality of second longitudinal slots extending from said other end of said collet to a point adjacent said first end of said collet for leaving a narrow connecting portion, said slots of said second plurality of slots being positioned between the slots of said first plurality of slots, and an adjustable stopper threaded into said threaded portion of said shank hole, said adjustable stopper being a hollow annular stopper having an internally tapered face on the end toward the collet, the tapered face tapering outwardly toward the collet, and said stopper having slots extending along said tapered face portion from the end toward the collet, whereby the tapered portion is expandable outwardly, a wedge means positioned in said tapered portion of the stopper and engaged with the tapered face, locking means engaged between said wedge means and said stopper for preventing rotation of said wedge means relative to said stopper, said wedge means being movable longitudinally relative to said stopper, whereby when the wedge means is engaged by the shank of a tool, it is urged into said tapered face for wedging the stopper outwardly into engagement with the adapter, at least said wedge means on the face toward said collet having at least one transverse groove therein for engagement by a screwdriver for rotating the stopper for threading it along said adapter.

2. A chuck for a cutting tool as claimed in claim 1 in which said locking means comprises a pin extending through said wedge into said slots in said stopper.

References Cited

UNITED STATES PATENTS

| | | | |
|---|---|---|---|
| 2,778,651 | 1/1957 | Benjamin | 279—1 XR |
| 2,778,651 | 1/1957 | Benjamin | 179—1 XR |
| 2,951,707 | 9/1960 | MacBlane | 279—41 |
| 3,365,204 | 1/1968 | Benjamin | 279—47 |

FOREIGN PATENTS

| | | |
|---|---|---|
| 842,125 | 7/1960 | Great Britain. |

ROBERT C. RIORDON, Primary Examiner

D. D. EVENSON, Assistant Examiner